United States Patent [19]

Schmitt et al.

[11] 3,862,308

[45] Jan. 21, 1975

[54] COMPOSITIONS FOR USE IN BODY CAVITIES AND METHOD OF USING THE SAME

[75] Inventors: Werner Schmitt; Robert Purrmann, both of Starnberg; Peter Jochum; Wolf Dieter Zahler, both of Hechendorf, Pilsensee, all of Germany

[73] Assignee: ESPE, Fabrik Pharmazeutischer Praparate GmbH, Oberbayern, Germany

[22] Filed: Apr. 3, 1972

[21] Appl. No.: 240,855

[30] Foreign Application Priority Data
Apr. 8, 1971 Switzerland.......................... 5180/70

[52] U.S. Cl. .................................................. 424/54
[51] Int. Cl............................................... A61k 7/16
[58] Field of Search................................ 424/78, 54

[56] References Cited
UNITED STATES PATENTS
3,308,020   3/1967   Wolf et al............................. 424/78
3,332,841   7/1967   Ainsworth et al. ................. 424/325

FOREIGN PATENTS OR APPLICATIONS
1,506,349   12/1967   France

OTHER PUBLICATIONS

Chemical Abstracts, Vol. 72, entry 33547y, 1970.

*Primary Examiner*—Richard L. Huff
*Attorney, Agent, or Firm*—Nolte and Nolte, P. C.

[57]   ABSTRACT

A mucous membrane or tissue in a cavity of a body of a human or an animal is washed or treated by introducing into the cavity into contact with the membrane or tissue and subsequently removing from the cavity an aqueous solution of an unsubstituted or substituted alkylenimine polymer having an average of at least six amino groups per molecule, each of the amino groups being free or quaternized.

4 Claims, No Drawings

COMPOSITIONS FOR USE IN BODY CAVITIES AND METHOD OF USING THE SAME

This invention relates to compositions and a method of using the composition for washing a mucous membrane or treating tissue in a cavity in the body generally of a human or of an animal, particularly a warm-blooded animal.

In medical and dental practice as well as in daily personal use there are a number of known compositions for washing mucous membranes in body cavities, particularly the oral cavity. Insofar as active ingredients are concerned, these contain for the most part astringent additives, such as alum or tincture of myrrh and the like. Also, it is especially important in dental practice, for example in connection with the preparation of artificial dentures, to be able quickly and reliably to remove the tenacious mucus coating which is usually present on the teeth. Mouthwashes known up to the present time to some extent, but not to a satisfactory extent, solve this problem. Also, solutions containing the enzyme mucinase do not always work and, when they do work, they work very slowly. Moreover, in the use of washes for mucous membranes in other parts of the body it is important to mechanically remove the mucus present there in order, for example, to permit more thorough operation by drugs, especially to assure a better effect on an inflamed mucous membrane.

It is therefore an object of the invention to provide improved washes for mucous membranes in body cavities, especially the oral cavity, which makes possible rapid removal of viscous, tough mucous coatings. Another object of the invention is to provide improved solutions for the treatment of tissue in body cavities, such as retraction solutions for use in the oral cavity. Other objects of the invention will become apparent from the following detailed description.

According to one aspect of the invention, there is provided a wash for mucous membranes constituted of an aqueous solution of an unsubstituted or substituted alkylenimine polymer having an average of at least 6 amino groups per molecule, each of the amino groups being free or quaternized. These polyamine compounds are generally representable as linear chains of units of the following formulas,

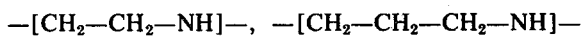

in which one or more of the N atoms may, by quaternization, be substituted, for example with an alkyl group, especially a methyl or ethyl group or a hydroxyalkyl group. Since such compounds can be obtained in a simple way by polymerization of alkylenimines, they are generaly designated as "polyalkylenimines." According to the present invention, preferred are such polyalkylenimines having an average degree of polymerization of 20 to 100. At higher degrees of polymerization aqueous solutions of the polyalkylenimines, even of low concentration, are of relatively high viscosity; accordingly, these high polymeric alklenimines are generally not as suitable for the purposes of the invention as are polymerizates of the aforementioned degrees of polymerization.

The polyalkylenimines, due to their being polyamines, are highly water-soluble. For physiological reasons, solutions of polyalkylenimines to be used according to the present invention should be neutral or weakly acidic. Since polyalkylenimines react alkalinically, they form addition salts with acids. To provide the anions of the addition salt or for the purpose of adjusting the pH value of the solution, there may be employed any physiologically acceptable acid. Suitable acids for the formation of the salts are especially monobasic acids, for example hydrochloric acid, acetic acid, benzoic acid, lactic acid and the like. Generally, according to the present invention, solutions of the polyalkylenimines in the form of their hydrochloric acid salts are preferred.

Especially simply produceable and therefore readily available and suitable for the purposes of the invention is the polymerizate of the primary substance of this class, namely, polyethylenimine. In any event, however, the polymerizate need not be a homopolymerizate, but it can also be a copolymerizate of ethylenimine and substituted ethylenimines, for example, N-methylethylenimine.

Since the water solubility of the polyalkylenimine is a prerequisite for its use as an aqueous washing or purification solution, for example for mucous membranes, the use only of such polyalkylenimine derivitives can be considered the water solubility of which is not too greatly decreased by the presence of hydrophobic substituents. Consequently, the nitrogen or carbon atoms of the polyethylenimine can be substituted only with lower alkyl groups, of up to 4 C atoms, especially methyl groups. However, hydrophilic substituents are also suitable, for example, hydroxyalkyl groups, in which the alkyl is of 2 to 4 C atoms, especially hydroxyethyl groups. Suitable for the production of polyalkylenimines to be used in the present invention are alkylenimines other than ethylenimine, such as 1,2-propylenimine, N-methylethylenimine and N-2-hydroxyethyl-ethylenimine. These monomers can be used for the production of homo- or copolymerizates, if desired with ethylenimine, for use in the present invention. The polyalkylenimines for use in the present invention can also be produced by the reaction of alkylene dihalides with ammonia. Thus, from dichloroethane and ammonia there is obtained a polyethylenepolyamine compound corresponding to polyethylenimine.

Regarding the addition onto the polyalkylenimine of physiologically acceptable anions, the latter can be introduced in a known manner by an interchange, for example by means of ion exchange or by conversion into the free polybases and neutralization with acids containing physiologically acceptable anions, e.g., chloride or lactate.

The special effect of polyalkylenimines is due to their mucus precipitating property. Probably they form insoluble complexes with the mucine of the mucus. The precipitates are then washed out of the body cavity with the solution. Similarly, mucousy blood residues from tooth extraction and the like may be readily removed. The precipitate does not agglomerate into large masses. The precipitate is finely dispersed and, accordingly, is readily washed out.

Polyalkylenimines, e.g., polyethylenimine and its derivatives, are known substances (see, for example, Houben-Weyl, "Methoden der Organischen Chemie," Volume XI/2, p. 269 et seq. and Ullman, "Encyklopadie der Technischen Chemie," Volume III, p. 144 and Volume XVII, p. 208, as well as p. 151 of the Supplement volume). Use of these substances for the improvement of fibrous materials, in paper production and as anti-static agents is known. The heretofore known properties of the polymerizates would not give the slightest indication that aqueous solutions of these polymers having an average degree of polymerization of at least 6 would be useful as mucous membrane washing agents, especially in dental practice.

A reliable means for removing mucous coatings from teeth is of great practical importance, because these coatings contribute to the formation of tartar on the teeth, which is not only cosmetically undesirable but also leads to dental caries. Also, in the production of artificial dentures it is of great importance that the negative obtained by impression corresponds sufficiently to the actual anatomical construction. In this respect, a particularly thorough cleaning of the oral cavity is especially important. The mucous membrane as well as the teeth must be freed of coatings of mucus and saliva simply, reliably and quickly. An impression of sufficient quality cannot be obtained if saliva remains on the mucous membrane and teeth.

By the precipitation and removal of mucus with the aid of the solutions of the invention treatment with medication of the mucous membrane in the oral cavity as well as in the vagina can be effected. Also, by the use of the solutions in the gastric and intestinal tract, precipitation and removal of mucous coatings therein can be effected. This is especially important in gastroscopy.

Even highly diluted polymer solutions according to the invention give the desired effect. Even at a concentration as low as 0.01 percent by weight of the polyalkylenimine precipitation of saliva is effected. As a practical matter, the solutions might generally be produced as aqueous concentrates to be diluted to the desired strength at the time of use. Due to the stability of the polymers, wash solutions or wash solution concentrates thereof are storable indefinitely.

It is especially advantageous in the use of these solutions as mouthwashes that they are practically tasteless. The mucus removal is subjectively observable only by the fact that the teeth surfaces feel rougher to the touch of the tongue after the use of the solutions of the invention. Due to their lack of taste, the mouthwashes of the invention are suitable also for personal use in place of strong astringent mouthwashes which are unpleasant or, in the case of tincture of myrrh, too bitter. Also, no harm can result from the use of larger doses because the high molecular substances cannot penetrate through the mucous membrane and, therefore, cannot be resorbed.

Generally, the polyalkylenimine solution can be prepared in concentrations of 0.001 percent to 1 percent for use and can also be prepared in such concentrations for storage. It is expedient to produce and sell the solutions in concentrations of the polyalkylenimine of 1 to 10 percent by weight with instructions prior to use to dilute the solution in the ratio of 1:100 to 1:1,000. Physiologically acceptable perfumes, colorants and therapeutic additives, such as bactericides and medically useful solution assistants for water-insoluble additives, can also be included.

It has been found that the polyalkylenimines according to the invention can advantageously be added to so-called retraction solutions. This type of solution is used to effect temporary opening of the pockets in the gums holding the teeth before the taking of an impression and to aid in the removal of the margin of the gum surrounding the tooth. Such opening and cleaning of the pockets in the gums is necessary in the production of precision impressions, because, otherwise, the impression material cannot flow into the pocket and, consequently, an incomplete reconstruction of the actual configuration of the mouth results.

The application of the retraction solution is carried out as a rule by soaking a filament or ring of suitable size and made of absorbent material with the retraction solution and then placing the filament or ring at the margin of the gum pocket.

It is also possible to sell the retraction material already soaked with the retraction agent. For this purpose, preferably a ring or filament of absorbent material is impregnated with the solution of the invention and then dried. Then, shortly before the filament or ring is to be employed, it is dipped briefly in water whereby the solution is regenerated.

The usual known retraction solutions generally contain astringent substances, such as aluminum chloride, zinc chloride, alum, tannic acid and the like. These substances indeed act astringently on the mucous membrane, however, they cleanse only very incompletely. With their assistance especially is not accomplished the removal of tenacious mucus. It has been found that by addition of a polyalkylenimine a perfect cleaning and, concurrently, an improved opening of the pockets in the gums in which the teeth are embedded is attained. Generally it will suffice to incorporate in the retraction solution a relatively small amount of the polyalkylenimine, preferably 0.1 to 2 percent by weight.

The following are examples of the production of washing and retraction solutions according to the invention. These examples are intended to illustrate rather than to limit the invention. All proportions are by weight, unless otherwise indicated.

EXAMPLE 1

A solution of 4 g. polyethylenimine of average degree of polymerization 50 in 100 ml. water is adjusted to a pH of 6 by the addition of 4N hydrochloric acid. 1 ml. of this solution diluted with 50 ml. of tap water results in a solution useful as a mouthwash.

EXAMPLE 2

A 6 percent solution of a copolymerizate of ethylenimine and N-ethylethylenimine (mol ratio of the former to the latter 3:1) of average degree of polymerization 35 is adjusted by the addition of lactic acid to a pH of 5. Prior to use as a mouthwash this solution is diluted with tap water in a ratio of the solution to the tap water of 1:100.

EXAMPLE 3

A solution of 10 g. poly-(N-2-hydroxyethyl) ethylenimine of average degree of polymerization 40 in 100 ml. water is adjusted to a pH of 7 by the addition of hydrochloric acid. By then adding water until the total quantity of solution is 8 l. there is obtained a mouthwash ready for use.

EXAMPLE 4

To 10 g. polyethylenimine of average degree of polymerization 70, 100 ml. water is added and the resultant solution is adjusted to a pH of 5.5 by the addition of hydrochloric acid. After addition of 20 g. of a solution assistant ("Cremophor EL" polyethoxylated castor oil ) and 2 g. peppermint oil additional water is added until the total quantity of solution is 200 ml. Prior to use as a mouthwash, this solution is diluted with tap water in a ratio of solution to tap water of 1:30 to 1:50.

EXAMPLE 5

To produce a retraction solution 200 g. of a commercial 50% solution of aluminum hydroxychloride ("Chlorohydrol") is mixed with 100 g. of a 2 percent solution of polyethylenimine of average degree of polymerization 20 which has been adjusted to a pH of 4 by the addition of hydrochloric acid.

EXAMPLE 6

A solution of 43 g. polyethylenimine of average degree of polymerizaation 50 in 500 ml. water is at a temperature of 25°C and with stirring gradually mixed with 250 g. dimethylsulfate. Simultaneously, a 30 percent caustic soda solution is run into the mixture to maintain the pH between 10 and 11. After the end of this dropwise mixing the solution is stirred an additional hour, then diluted with water to 1 l. and run through a mixed bed column constituted of strong acid and strong basic ion exchangers (namely, "Permutit RS" and "Permutit ES"). There is thus obtained a solution of 23.5 g. of a quaternized polyethylenimine which is adjusted to a pH of 6 by the addition of hydrochloric acid and in order to result in a solution useful as a mouthwash is diluted with water until the quantity of solution totals 20 l.

What is claimed is:

1. Method of washing an oral cavity to remove mucus therefrom, comprising introducing into the cavity and subsequently removing from the cavity without ingesting a composition consisting essentially of an aqueous solution of a concentration of 0.001 to 1 percent of a polymer selected from the group consisting of unsubstituted and substituted polyalkylenimines of repeating units of the formula $-[CH_2-CH_2-NH]-$ or $-[CH_2-CH_2-CH_2-NH]-$, said substituted polyalkylenimines substituted on at least one atom with an alyl group of 1 to 4 carbon atoms or a hydroxyalkyl group of 2 to 4 carbon atoms, copolymers of at least one of unsubstituted alkylenimines of 2 to 3 carbon atoms and said substituted alkylenimes substituted on at least one atom with an alkyl group of 1 to 4 carbon atoms or a hydroxyalkyl group of 2 to 4 carbon atoms and physiologically acceptable monobasic acid addition salts of any of the foregoing, the polymer having an average degree of polymerization of at least 6.

2. Method according to claim 1, in which the acid is of the group consisting of hydrochloric, acetic, benzoic and lactic acid.

3. Method according to claim 1, in which the average degree of polymerization of the polymer is 20 to 100.

4. Method according to claim 3, in which the polymer is a homopolymer or copolymer of at least one of ethylenimine, 1,2-propylenimine, N-methylethylenimine, and N-2-hydroxyethylethylenimine or the addition salt of any of the foregoing with a physiologically acceptable monobasic acid.

* * * * *